US009218719B2

(12) United States Patent
Meyer

(10) Patent No.: US 9,218,719 B2
(45) Date of Patent: Dec. 22, 2015

(54) ELECTRONIC GAMING MACHINE AND GAMING METHOD

(71) Applicant: AINSWORTH GAME TECHNOLOGY LIMITED, Newington (AU)

(72) Inventor: Jason Meyer, Abbotsford (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 217 days.

(21) Appl. No.: 13/797,990

(22) Filed: Mar. 12, 2013

(65) Prior Publication Data

US 2014/0235319 A1 Aug. 21, 2014

(30) Foreign Application Priority Data

Feb. 20, 2013 (AU) ................................ 2013900559

(51) Int. Cl.
*A63F 13/00* (2014.01)
*G07F 17/32* (2006.01)

(52) U.S. Cl.
CPC .................................... *G07F 17/326* (2013.01)

(58) Field of Classification Search
USPC .......................................... 463/16–20, 25–31
See application file for complete search history.

(56) References Cited

U.S. PATENT DOCUMENTS

| | | | | |
|---|---|---|---|---|
| 6,089,977 | A | 7/2000 | Bennett | |
| 6,413,161 | B1 * | 7/2002 | Baerlocher et al. | 463/20 |
| 6,921,335 | B2 | 7/2005 | Rodgers et al. | |
| 6,935,947 | B1 * | 8/2005 | Singer et al. | 463/16 |
| 7,553,231 | B2 | 6/2009 | Rodgers et al. | |
| 7,695,365 | B2 | 4/2010 | Casey | |
| 8,137,179 | B2 | 3/2012 | Jensen et al. | |
| 8,292,724 | B2 | 10/2012 | Marks et al. | |
| 2002/0010018 | A1 * | 1/2002 | Lemay et al. | 463/20 |
| 2002/0052233 | A1 | 5/2002 | Gauselmann | |
| 2010/0298042 | A1 | 11/2010 | Berman et al. | |
| 2012/0122546 | A1 * | 5/2012 | Lange et al. | 463/20 |
| 2013/0017881 | A1 | 1/2013 | Watkins | |

FOREIGN PATENT DOCUMENTS

| | | |
|---|---|---|
| AU | 722902 | 8/2000 |

* cited by examiner

*Primary Examiner* — Masud Ahmed
(74) *Attorney, Agent, or Firm* — Cook Alex Ltd.

(57) ABSTRACT

An electronic gaming machine includes an electronic game controller and a display where game symbols are arranged in an array of predetermined game positions. The appearance of a first special symbol causes a group of predetermined game positions to be selected where each game symbol occupying a predetermined game position in the group is changed into a second special symbol either during a play of a game or at the completion of the play, the change into the second special symbol being visible to the player. A gaming method is also provided.

24 Claims, 11 Drawing Sheets

ELECTRONIC GAMING MACHINE AND GAMING METHOD

BACKGROUND

The present invention relates to an electronic gaming machine and in a particular an electronic gaming machine using a base game and a feature game. The invention has been developed primarily for use as an electronic gaming machine and will be described hereinafter by reference to this application.

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

In an electronic gaming machine, the mechanical reels are replaced with video images of the reels, which are displayed on a video display screen. The electronic gaming machine has an internal electronic game controller, typically a computer, that controls the display of images on the video display screen so that the reels are visibly spun on the screen to simulate a physical reel of a traditional gaming machine. Electronic gaming machines are also more versatile in presenting game information, varying the probabilities for a player to win a prize and varying the type of game that is played.

In an electronic gaming machine, the mechanical reels are replaced with video images of the reels, which are displayed on a video display screen. The electronic gaming machine has an internal electronic game controller, typically a computer, that controls the display of images on the video display screen so that the reels are visibly spun on the screen to simulate a physical reel of a traditional gaming machine. Electronic gaming machines are also more versatile in presenting game information, varying the probabilities for a player to win a prize and varying the type of game that is played. Conventionally, such reel-type games comprise a main or base game offered by the electronic gaming machine.

Bonus or "feature" games may be provided by an electronic gaming machine in addition to the base or main game. Typically feature games use the same set of reels as the main game and are limited to a set of free games operated under a single set of rules that may be slightly modified from the base game. Once the free feature games have been played, the electronic gaming machine resets itself and returns the player back to the base game. This standard structure to game play limits the variation in the play of the electronic gaming machine. Consequently, it is difficult to retain player interest because there is no apparent incentive for the player to continue playing the same electronic gaming machine once the player becomes familiar with the feature game and the main game. Also, it is difficult to retain player interest since there is little differentiation between gaming machines in terms of the main and feature games that are played.

It is an object of the present invention to overcome or substantially ameliorate one or more of the disadvantages of prior art, or at least to provide a useful alternative.

It is an object of the invention in at least one preferred form to provide an electronic gaming machine and a method for controlling an electronic gaming machine that encourages player interest.

SUMMARY

According to a first aspect of the invention, there is provided an electronic gaming machine comprising:

a display for displaying a game, wherein said game comprises game symbols arranged into an array of predetermined game positions arranged in rows and columns and where predetermined winning combinations of randomly selected game symbols in said game award prizes to a player, and an electronic game controller for controlling the display of game symbols on said display, wherein the appearance of a first special symbol causes said electronic game controller to select a group of predetermined game positions, said group comprising at least one predetermined game position from at least two of said columns, and wherein each game symbol occupying a predetermined game position in said group is changed into a second special symbol either during a play of said game or at the completion of said play, said change into said second special symbol being visible to said player.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Preferably, said group comprises all the predetermined game positions in said array.

Preferably, wherein said group comprises all the predetermined game positions on said display. In one preferred form, there is a plurality of said arrays on said display, and in this case all the predetermined game positions in each array are selected for the group to be changed into the second symbol. In another preferred form, the array may be extended during game play to add further predetermined game positions. In this case, the further predetermined game positions would also be selected for the group to be changed into the second symbol. It is envisaged that the first symbol can appear on one of the predetermined game positions in one of the arrays or appear on the display and not form part of any of the array(s).

Preferably, said first special symbol appears in a predetermined game position of a first column and said group comprises at least one predetermined game position of a second column different to said first column. More preferably, said group comprises the predetermined game positions in said second column.

Preferably, said group comprises at least one predetermined game position said first column. In other words, said group comprises at least one predetermined game position in the same column as said first special symbol. In one preferred form, said group comprises all the predetermined game positions in said first column.

Preferably, said group comprises the predetermined game position occupied by said first special symbol.

Preferably, said group comprises the predetermined game positions in the columns to one side of said first column. In a further preferred form, said one side is to the left of said first column. Alternatively, in another preferred form, said one side is to the right said first column.

Preferably, the appearance of said first special symbol in a first and a second predetermined game position causes said electronic game controller to select said group such that said group comprises predetermined game positions located between said first and second predetermined game position. Alternatively, said first special symbol comprises two or more different first symbols such that the appearance of at least two of said different first symbols in a first and a second predetermined game position causes said electronic game controller to select said group such that said group comprises predetermined game positions located between said first and second predetermined game position. In either case, it is preferred that said group comprises predetermined game positions that are also in the same row and/or column as said first predetermined game position or said second predetermined game position. In one preferred form, said group comprises said first predetermined game position and/or said second predetermined game position.

Preferably, said group defines a shape on said array. In one preferred form, said shape is rectangular. However, it will be appreciated that other shapes can be formed, including square, triangular or other polygonal shapes, as well as irregular shapes. In an alternative preferred form, said group defines a pattern on said array. In one embodiment of this alternative form, said pattern includes a cross, an X-pattern or other geometrical pattern.

Preferably, said first symbol comprises a substitute symbol.

Preferably, said second symbol comprises at least one of said game symbols, a substitute symbol, a symbol that reveals another game symbol and a new game symbol. In one preferred form, said second symbol comprises a symbol that reveals another game symbol.

Alternatively, said second symbol is the same as, or has the same effect on said game, as said first special symbol.

Preferably, said second symbol comprises two or more different second symbols such that said game symbols from said group change into at least two of said different second symbols. More preferably, one of said at least two different second symbols acts as both a second symbol and as the game symbol it changed from.

Preferably, as part of said game, said columns visually move to simulate rotation thereof and said play comprises from when said columns begin to visually move to when said columns stop visually moving. Alternatively, said predetermined game positions individually move visually to simulate rotation of each said predetermined game position.

Preferably, said game comprises a jackpot prize. More preferably, said jackpot prize comprises a mystery jackpot. In one preferred form, said game shares said jackpot prize with another game played on said electronic gaming machine. In another preferred form, said game shares said jackpot prize with another game played on a different electronic gaming machine to said electronic gaming machine.

Preferably, said electronic game controller is configured to display a base game and/or a feature game on said display. More preferably, said game comprises said base game. Alternatively, said game comprises said feature game.

Preferably, the game symbols in said feature game and said base game are arranged in arrays of the same shape or type. Alternatively, said game symbols in said feature game and said base game are arranged in differently shaped arrays. The shapes of said arrays are preferably rectangular, circular, triangular, oval, semi-circular or other non-rectangular shape.

Preferably, said electronic game controller causes the display of said feature game in response to said trigger event. Alternatively, said electronic game controller causes the display of said feature game and said base game during play of said base game, said feature game being inactive until triggered. In this preferred form, the change in said feature game from being inactive to active may be indicated on the display.

Preferably, the electronic gaming machine comprises a mobile electronic gaming device. More preferably, said mobile electronic gaming device comprises a handheld electronic device. Alternatively, said electronic gaming machine comprises a computer. More preferably, said computer is connected to a communication network.

According to a second aspect of the invention, there is provided a gaming method for an electronic gaming machine comprising a display and an electronic game controller, the method comprising the steps of:

controllably displaying game symbols on said display for playing a game, wherein said game symbols are arranged into an array of predetermined game positions, said predetermined game positions being arranged in rows and columns, and where predetermined winning combinations of randomly selected game symbols award prizes to a player;

in response to the appearance of a first special symbol on said display, selecting a group of predetermined game positions, said group comprising at least one predetermined game position from at least two of said columns, and changing each game symbol occupying a predetermined game position in said group into a second special symbol either during a play of said game or at the completion of said play, said change into said second special symbol being visible to said player.

Preferably, said group selecting step comprises selecting all the predetermined game positions in said array.

Preferably, said group selecting step comprises selecting all the predetermined game positions on said display.

Preferably, said first symbol appears in a predetermined game position of a first column, said group selecting step comprises selecting at least one predetermined game position of a second column different to said first column. More preferably, said group selecting step comprises selecting the predetermined game positions in said second column.

Preferably, said group selecting step comprises selecting at least one predetermined game position in said first column. That is, at least one predetermined game position in the same column as said first special symbol is selected. In one preferred form, said group selecting step comprises selecting all the predetermined game positions in said first column.

Preferably, said group selecting step comprises selecting the predetermined game position occupied by said first special symbol.

Preferably, said group selecting step comprises selecting the predetermined game positions in the columns to one side of said first column. In one preferred form, said group selecting step comprises selecting the predetermined game positions in the columns to the left of said first column. In another preferred form, said group selecting step comprises selecting the predetermined game positions in the columns to the right said first column.

Preferably, where said first special symbol appears in a first and a second predetermined game position, said group selecting step comprises selecting predetermined game positions located between said first and second predetermined game position. Alternatively, said first special symbol comprises two or more different first symbols and the method further comprises the step of determining the appearance of at least two of said different first symbols in a first and a second predetermined game position and said group selecting step comprises selecting predetermined game positions located between said first and second predetermined game position. In either case, it is preferred that said group selecting step comprises also selecting predetermined game positions in the same row and/or column as said first predetermined game position or said second predetermined game position. In one preferred form, said group selecting step comprises selecting said first predetermined game position and/or said second predetermined game position.

Preferably, said group selecting step comprises selecting predetermined game positions such that said group defines a shape on said array. In one preferred form, said shape is rectangular, square, triangular or other polygonal shape. Alternatively, said shape includes an irregular shape.

Alternatively, said group selecting step comprises selecting predetermined game positions such that said group defines a pattern on said array. More preferably, said pattern includes a cross, an X-pattern or other geometrical pattern.

Preferably, said first symbol is provided as a substitute symbol.

Preferably, said changing step comprises changing said second symbol to at least one of said game symbols, a substitute symbol, a symbol that reveals another game symbol and a new game symbol. Alternatively, said changing step comprises changing said second symbol to said first symbol or a symbol that has the same effect on said game as said first special symbol.

Preferably, said second symbol comprises two or more different second symbols and said changing step comprises changing said game symbols from said group into at least two of said different second symbols. More preferably, the method further comprises the step of providing one of said at least two different second symbols to act as both a second symbol and as the game symbol it changed from.

Preferably, said method further comprises the step of visually moving said columns as part of said game to simulate rotation of said columns and wherein said play comprises from when said columns begin to visually move to when said columns stop visually moving.

Preferably, the method further comprises the step of providing a jackpot prize for said game. More preferably, said jackpot prize comprises a mystery jackpot. In one preferred form, said method comprises the steps of more than one game on said electronic gaming machine and sharing said jackpot prize between at least two of said games. In another preferred form, said method comprises the steps of sharing said jackpot prize between said game and a game playable on another electronic gaming machine.

The method also preferably has the preferred features of the first aspect of the invention not otherwise stated above.

According to a third aspect of the invention, there is provided a computer system comprising a central processing unit configured for communication with an electronic gaming machine, wherein said computer system is configured to perform the method of the second or fourth aspects of the invention.

According to a fourth aspect of the invention, there is provided a computer program configured to perform the method of the second or fourth aspects of the invention.

According to a fifth aspect of the invention, there is provided a non-transitive carrier medium carrying computer executable code that, when executed on a central processing unit configured for communication with an electronic gaming machine, causes the central processing unit to perform the method of the second or fourth aspects of the invention.

BRIEF DESCRIPTION OF THE DRAWINGS

Preferred embodiments of the invention will now be described, by way of example only, with reference to the accompanying drawings in which.

DETAILED DESCRIPTION OF THE VARIOUS EMBODIMENTS

Figure 1:
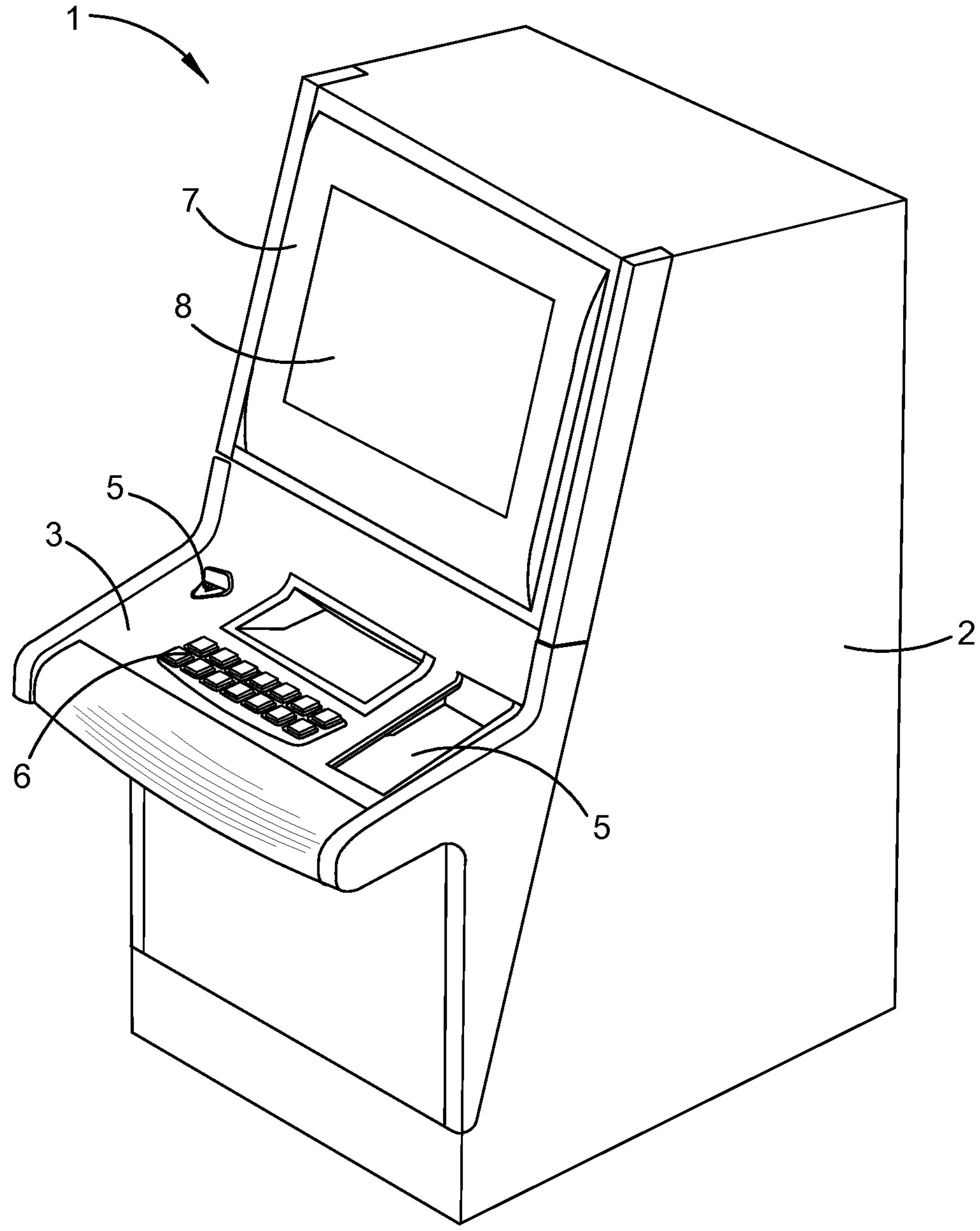
FIG. 1 is a perspective view of an electronic gaming machine according to an embodiment of the invention.
Figure 2:
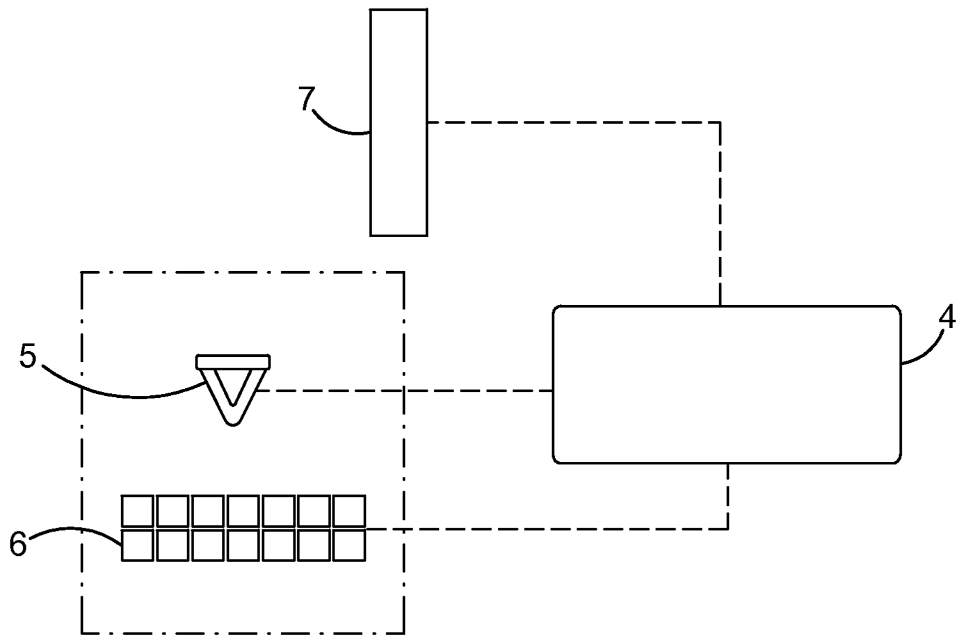
FIG. 2 is a schematic drawing of an electronic game controller for the electronic gaming machine of FIG. 1.

Referring to FIG. 1, an electronic gaming machine 1 according to a first embodiment of the invention includes a cabinet 2, a console 3 and an internal electronic game controller 4. The console 3 has various input devices including vending slots 5 for receiving monetary bets and a plurality of buttons 6 for actuation by a player. The electronic game controller 4 is generally in the form of a central processing unit, such as a computer, and is in electronic communication with a display in the form of a video display screen 7, as well as various input devices on the console 3, as best shown in FIG. 2. It is also appreciated that a person skilled in the art would readily understand the location and use of the electronic game controller 4 in the electronic gaming machine 1.

The video screen 7 may also display other standard game information (not shown), including the number of pay lines available, the number of player-selected pay lines, the amount of credits per line, the amount of player credits the amount of the current bet wagered by the player, the amount of wins by the player, a message area, a general menu button and a current denomination button indicating the currently selected base bet denomination.

Figure 3:
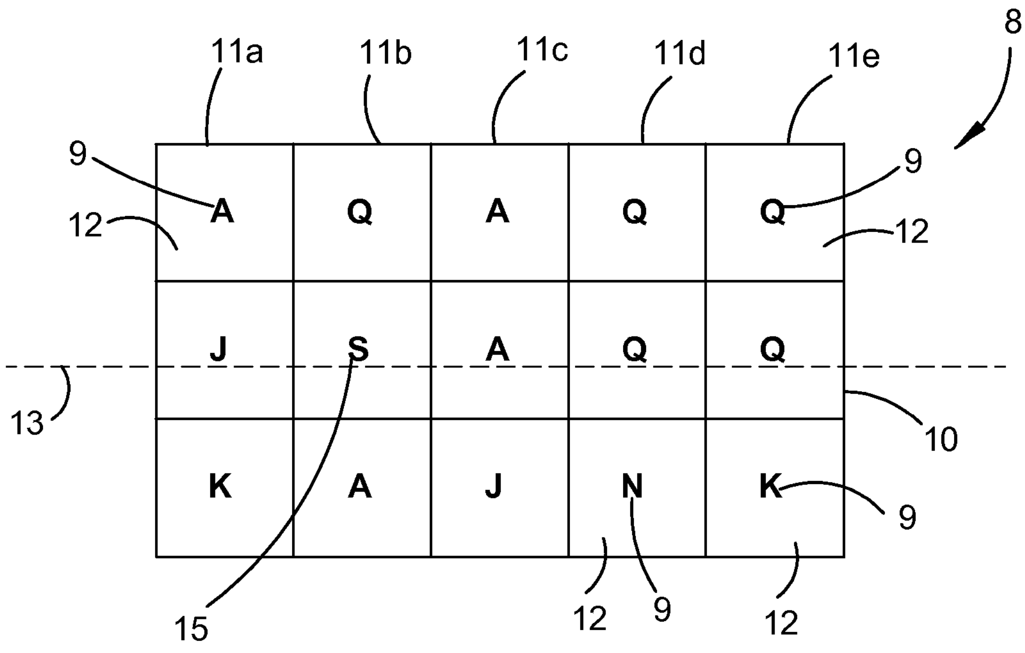
FIG. 3 is a schematic drawing illustrating a game displayed on an array of the electronic gaming machine of FIG. 1.

The electronic game controller 4 is programmed to provide a game 8 on the electronic gaming machine 1 for play by a player, as best shown in FIG. 1. The game 8 has game symbols 9 arranged into an array 10 in the form of five columns or "reels" 11, as best shown in FIG. 3. While the array 10 is arranged with five columns or "reels" 11 and an even number of rows, it will be appreciated by one skilled in the art that other arrays could be used, such as the industry standard 5×3 or 3×3, 4×3, 5×5, 4×4, etc. Also, the array 10 can have an uneven number of rows and/or columns.

The array 10 of the game 8 defines predetermined game positions in the form of "squares" or cells 12, in which the game symbols 9 appear. The array 10 is arranged so that a player can select one or more predetermined "pay lines" 13 defined around the array, which correspond to combinations of the game positions 12. The pay lines 13 correspond to the lines selected by the player and generally comprise at least one game position 12 from each reel 11. The number of pay lines 13 that can be selected by the player depends on the amount of the monetary bet for playing a game on the array 10.

The game symbols 9 can include a mixture of picture symbols (such as animal symbols, playing card symbols, scatter symbols, wild card symbols and trigger symbols to trigger a feature game (if any). The electronic game controller 4 randomly determines the appearance of the game symbols 9 on the array 10.

The player initially makes a bet using vending slots 5 initiate play of the electronic gaming machine 1 to build up credit to play any of the selectable games on the electronic gaming machine. For example, the player can bet or wager monetary amounts equivalent to a particular amount of credits, depending on the bet denomination selected for the game 8. Also, the player can make any additional side bets or ante-bets during play of the game 8 once the game has commenced to access additional features in the game, such as increasing the number of winning combinations in the game.

Figure 4:
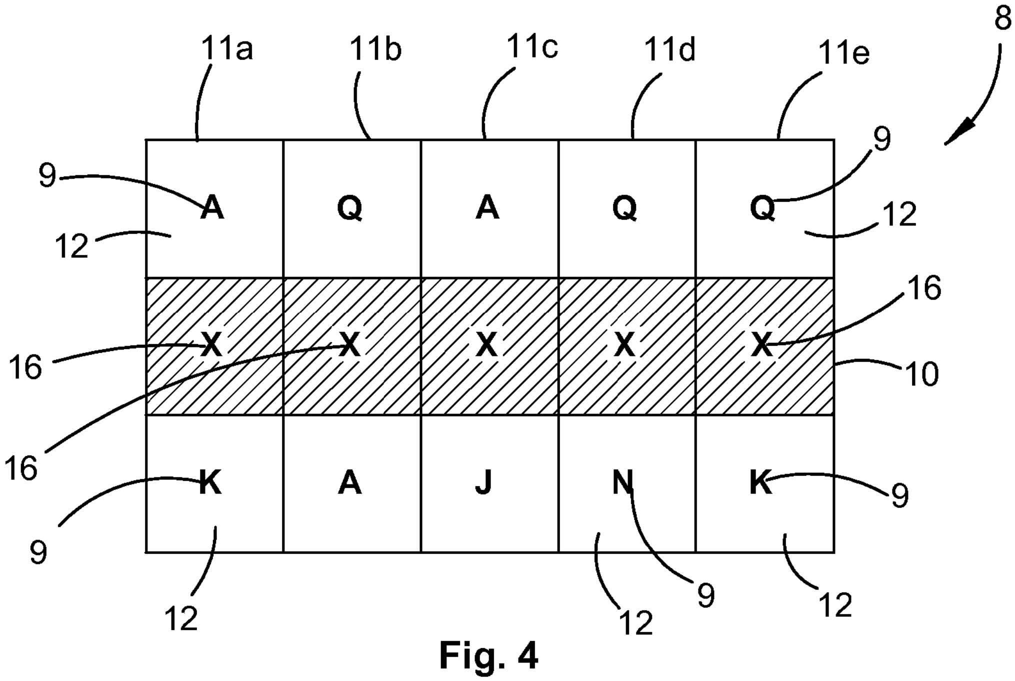
FIG. 4 is a schematic drawing illustrating a change to the game of FIG. 3.

The electronic game controller 4 then causes the reels 11 to appear to visibly rotate or "spin", and randomly display the game symbols 9 in each cell 12. The electronic game controller 4 also randomly determines the appearance of a special "S" symbol 15 on the display 7, which in this embodiment is on the array 10, as best shown in FIG. 3. After the reels 11 stop spinning, the electronic game controller 4 determines whether there are any special S symbols 15 on the array 10. If not, then the electronic game controller 4 determines whether there are any predetermined winning combinations of the game symbols 9 appear in any player-selected pay lines 13, such as "three of a kind", "four of a kind" and "five of a kind" and/or other combinations of a "full house", "straight" or "flush" where the game symbols represent playing cards. It will be appreciated that other winning combinations of game symbols 9 can also be provided. If so, the electronic game gaming machine 1 enters a winning game state and awards a prize according to the displayed predetermined winning combination(s).

Where there is the S symbol 15 appears on the array 10, it causes the electronic game controller 4 to select a group of the cells 12 where the game symbols 9 are changed into another special "X" symbol 16, as best shown in FIG. 4. The cells are selected so that at least one cell 12 is selected from a reel 11*a*, 11*c*, 11*d*, 11*e* that is different to the reel 11*b* that contains the S symbol 15. In this embodiment, the electronic game controller 4 selects the cells 12 that are in the same row as the special S symbol 15. The group also includes the special S symbol.

The X symbol 16 can act as a substitute (wild), scatter, jackpot or trigger symbol. Alternatively, the X symbol 16 can itself change into another game symbol 9 (for example, an A symbol), including a substitute, scatter, jackpot or trigger symbol. The X symbol 16 can change into a completely new symbol different to the other game symbols, the new symbol conferring a game enhancing element such as a bonus prize or free games. In this embodiment, the X symbols 16 act as substitute or wild symbols. After changing the game symbols 9 to X symbols 16, the electronic game controller 4 then determines whether winning combinations of game symbols occur on player-selected pay lines 13.

The electronic game controller 4 may also determine the appearance of the scatter symbols in the game 8 (where the X symbol 16 is not a scatter symbol), typically through a random determination. However, it will be appreciated that this determination need not be totally random as the electronic game controller 4 may switch to a reel strip having a greater probability of a scatter symbol appearing where the feature game has not be triggered for a predetermined number of plays of the base game. Also, where a scatter symbol is one of the symbols that are to be changed into the special X symbol 16, the X symbol retains the function of the scatter symbol. This may be done by providing a hybrid version of the special X symbol to indicate that it functions or acts as both the X symbol and as a scatter symbol. For example, the hybrid X symbol may have the word "scatter" appear underneath the "X" to indicate its dual function.

Hence, it can be seen that the player's interest and excitement in the game 8 will be enhanced once the special S symbol 15 appears as he or she will anticipate the change in other game symbols 9 that are likely to increase the chances of obtaining a winning combination on the array 10.

Figure 5:
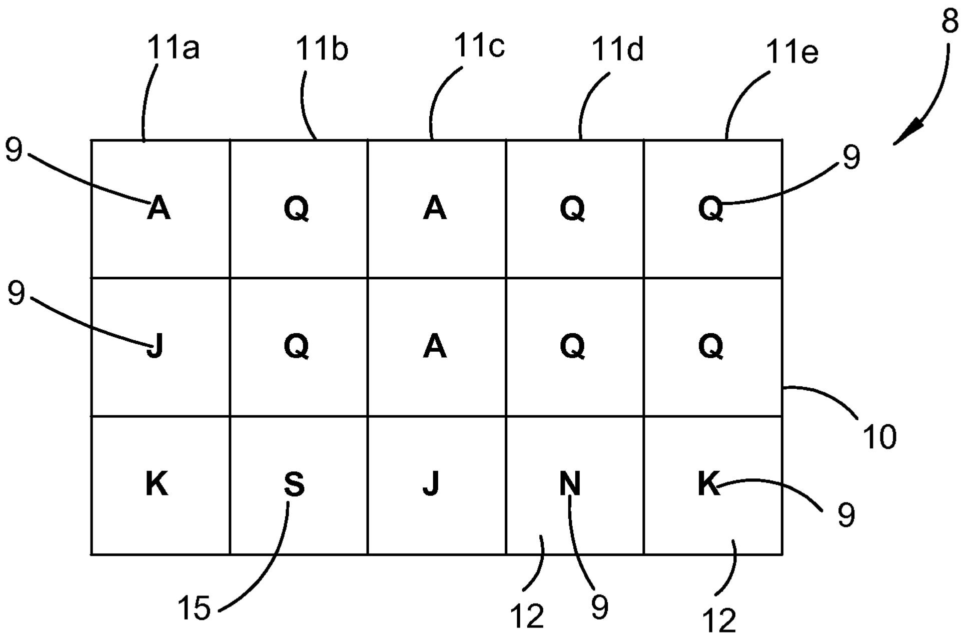
FIG. 5 is a schematic drawing illustrating a game displayed on an array of the electronic gaming machine according to another embodiment of the invention.
Figure 6:
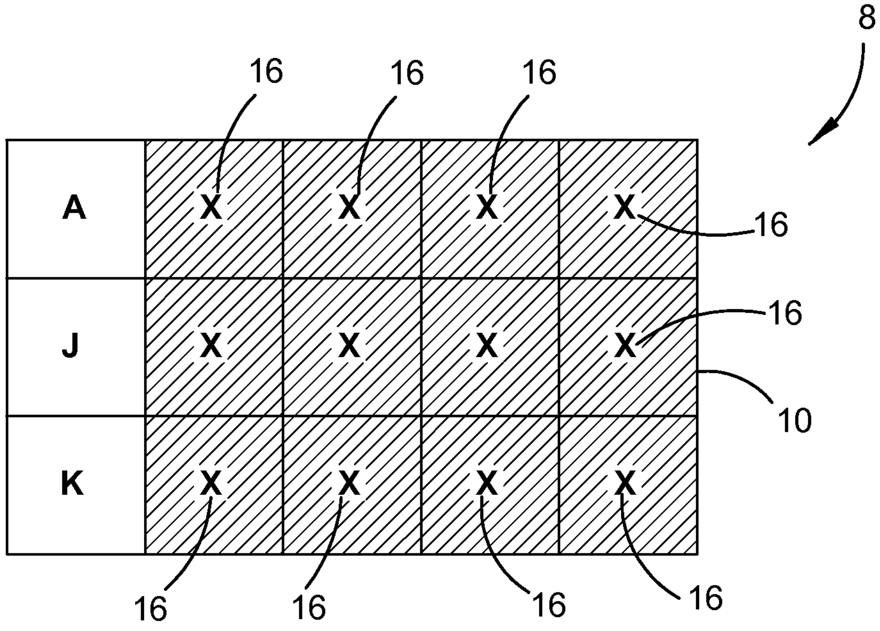
FIG. 6 is a schematic drawing illustrating a change to the game of FIG. 5.

Another embodiment of the invention is illustrated in FIGS. 5 and 6, where corresponding features have been given the same reference numerals. In this embodiment, the appearance of the special S symbol 15 causes the electronic game controller 4 to select all the cells in the reels to one side of the reel 11*b* in which the S symbol 15 appears, as best shown in FIG. 6. In this case the reels 11*c*, 11*d* 11*e* to the right of the reel 11*b* have been selected to change the game symbols 9 into the special X symbol 16. The change to the X symbol 16 has also included the game symbols 9 that occupy the reel 11*b* that has the special S symbol 15, including the special S symbol itself. However, in another embodiment, only the game symbols 9 in the reels 11*c*, 11*d*, 11*e* to the right of the reel 11*b* are changed into the X symbol 16. In all other respects, this embodiment works in the same way as the embodiment of FIGS. 3 and 4 above.

Figure 7:
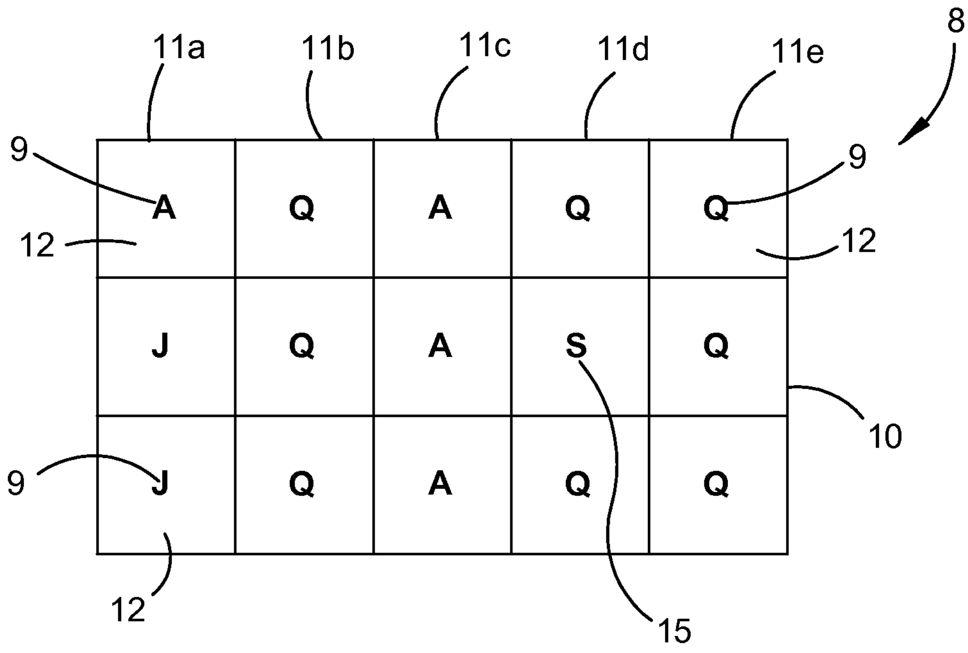
FIG. 7 is a schematic drawing illustrating a game displayed on an array of the electronic gaming machine according to a further embodiment of the invention.
Figure 8:
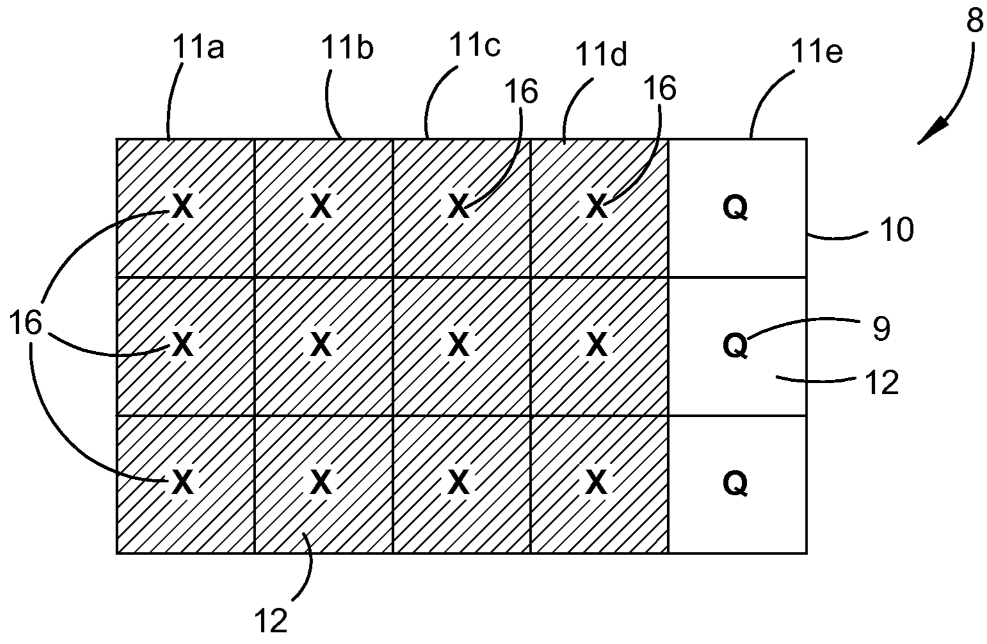
FIG. 8 is a schematic drawing illustrating a change to the game of FIG. 7.

A further embodiment is illustrated in FIGS. 7 and 8, where corresponding features have been given the same reference numerals. As with the embodiment of FIGS. 5 and 6, in this embodiment the appearance of the special S symbol 15 causes the electronic game controller 4 to select all the cells in the reels to one side of the reel 11*db* in which the S symbol 15 appears, as best shown in FIG. 8. However, in this case the reels 11*a*, 11*b*, 11*c* to the left of the reel 11*d* have been selected to change the game symbols 9 into the special X symbol 16. Again, the change to the X symbol 16 has also included the game symbols 9 that occupy the reel 11*d* that has the special S symbol 15, including the special S symbol itself. However, in another embodiment, only the game symbols 9 in the reels 11*a*, 11*c*, 11*c* to the left of the reel 11*d* are changed into the X symbol 16. In all other respects, this embodiment works in the same way as the embodiment of FIGS. 3 and 4 above.

Figure 9:
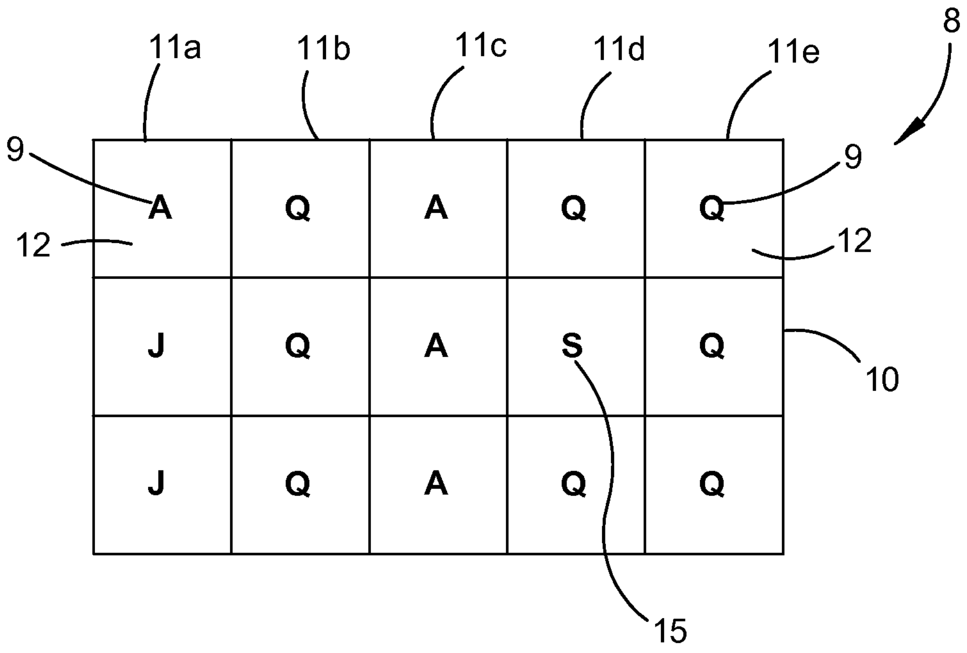
FIGS. 9 to 16 are schematic drawings illustrating other types of possible changes to the game according to further embodiments of the invention.
Figure 10:
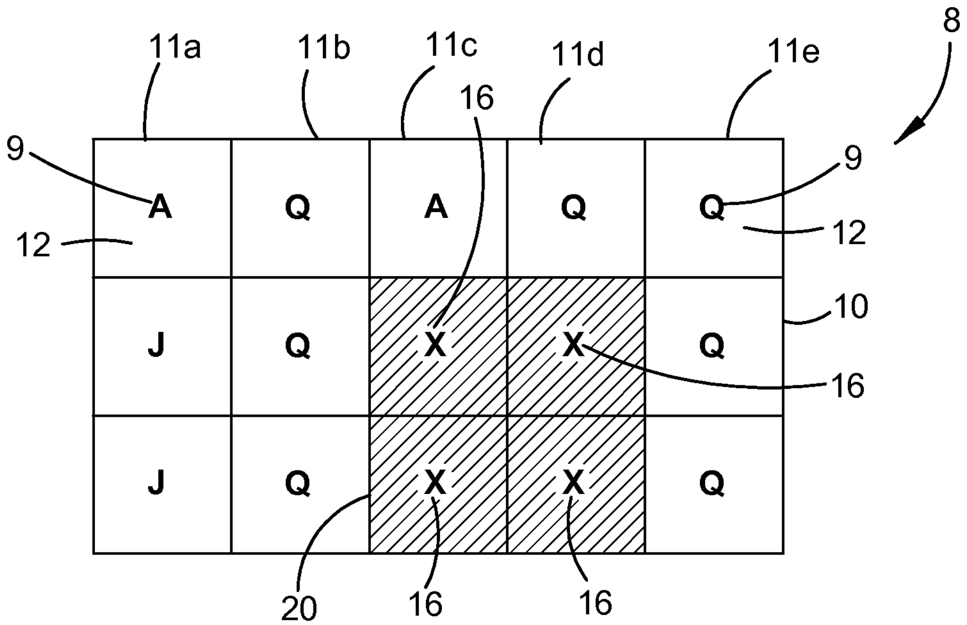
Figure 11:
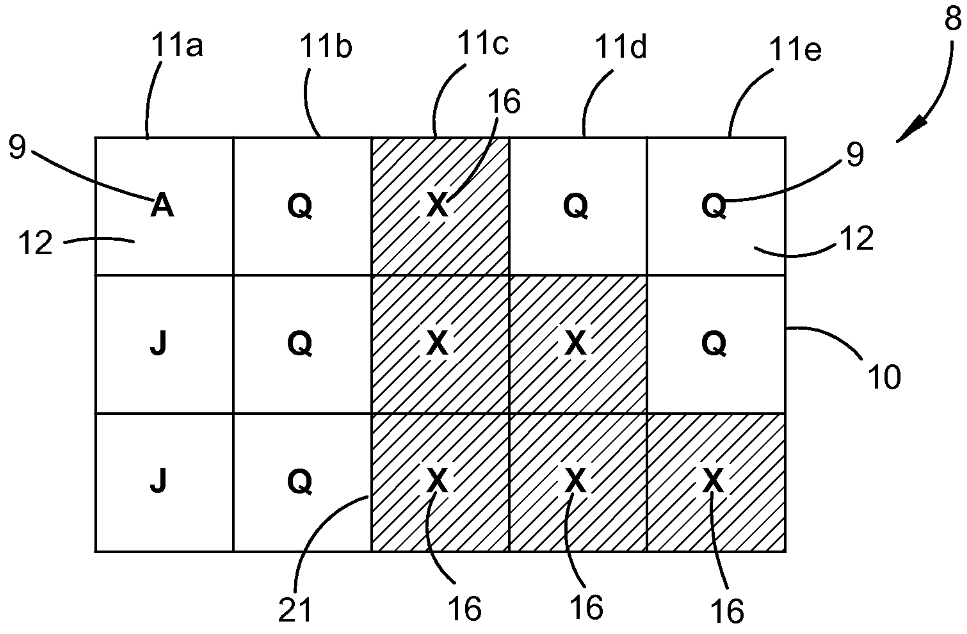
Figure 12:
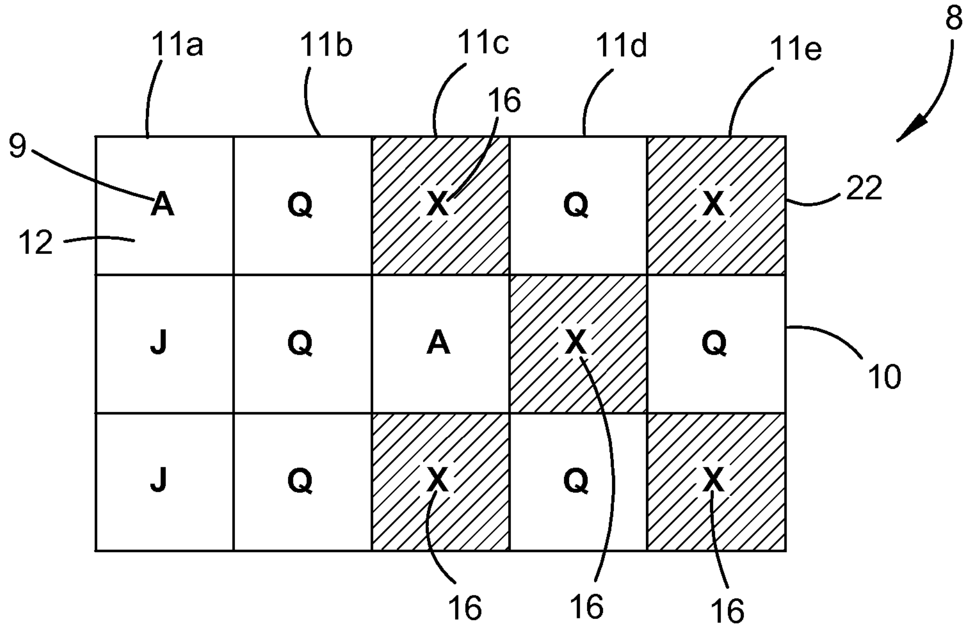
Figure 13:
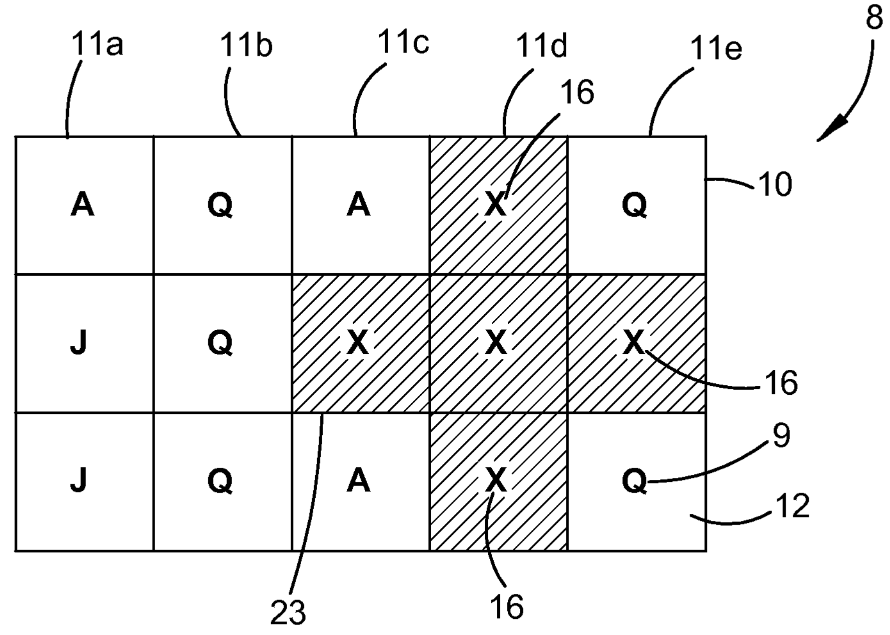
Figure 14:
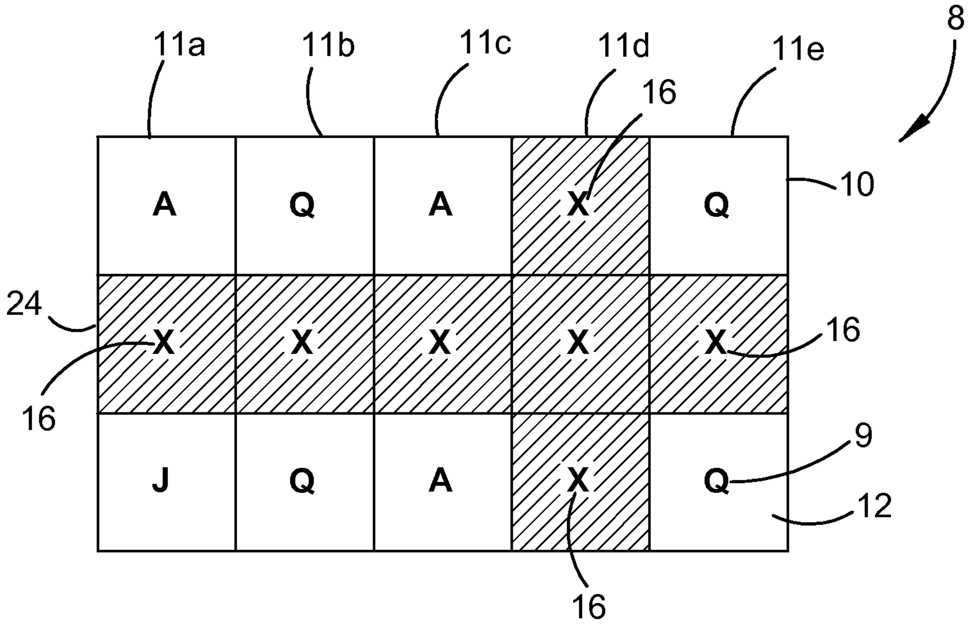
Figure 15:
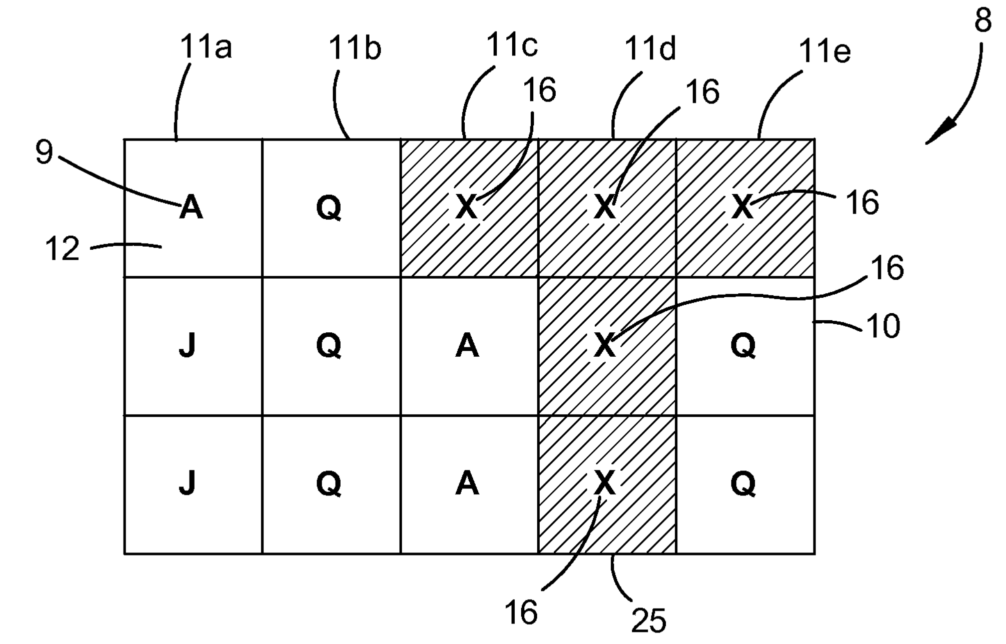
Figure 16:
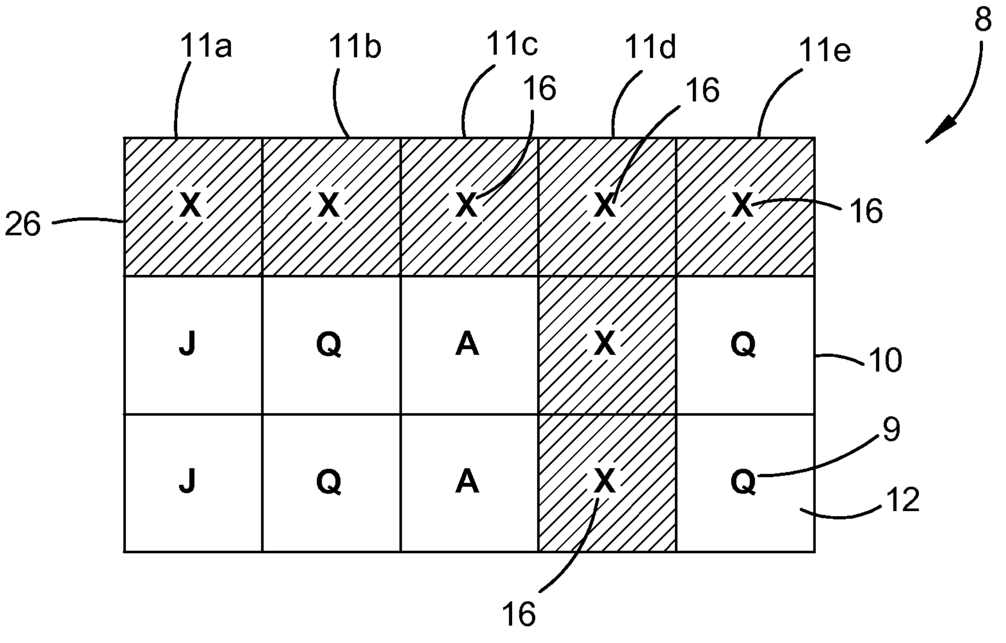

Yet further embodiments are illustrated in FIGS. 9 to 16, where corresponding features have been given the same reference numerals. In these embodiments, the appearance of the special S symbol 15 in reel 11*d* (as shown in FIG. 9) causes the electronic game controller 4 to select a group of cells 12 that define a shape or pattern on the array 10. In FIG. 10, the selected group of cells 12 that have their game symbols 9 change to the X symbol 16 defines a square shape 20 comprising cells from reels 11*c* and 11*d*. In FIG. 11, the selected group of cells 12 that have their game symbols 9 change to the X symbol 16 defines a triangular shape 21 (or a wedge-like pattern) comprising cells from reels 11c and 11d. In FIG. 12, the selected group of cells 12 that have their game symbols 9 change to the X symbol 16 defines an X-shape or pattern 22 comprising cells from reels 11c, 11d and 11e. In FIG. 13, the selected group of cells 12 that have their game symbols 9 change to the X symbol 16 defines a cross pattern 23 comprising cells from reels 11c, 11d and 11e. In FIG. 14, the selected group of cells 12 that have their game symbols 9 change to the X symbol 16 defines an extended cross pattern 24 comprising cells from reels 11a, 11b, 11c, 11d and 11e. In FIG. 15, the selected group of cells 12 that have their game symbols 9 change to the X symbol 16 defines a T-shape or pattern 25 comprising cells from reels 11c, 11d and 11e. In FIG. 16, the selected group of cells 12 that have their game symbols 9 change to the X symbol 16 defines an extended T-shape or pattern 26 comprising cells from reels 11a, 11b, 11c, 11d and 11e. It will be appreciated that the possible shapes and/or patterns are not limited to those illustrated in the Figures and that other polygonal shapes and/or geometrical patterns can be obtained depending on the various permutation of selected cells 12 and the size of the array 10, and even include irregular shapes and/or patterns. For example, each of the shapes and/or patterns illustrated in FIGS. 10 to 16 have an alternative "inverted" (mirror image) or rotated (90° clockwise or counter-clockwise) versions that provide additional possible shapes and/or patterns that can be provided in the invention. In all other respects, these embodiments work in the same way as the embodiment of FIGS. 3 and 4 above.

Figure 17:
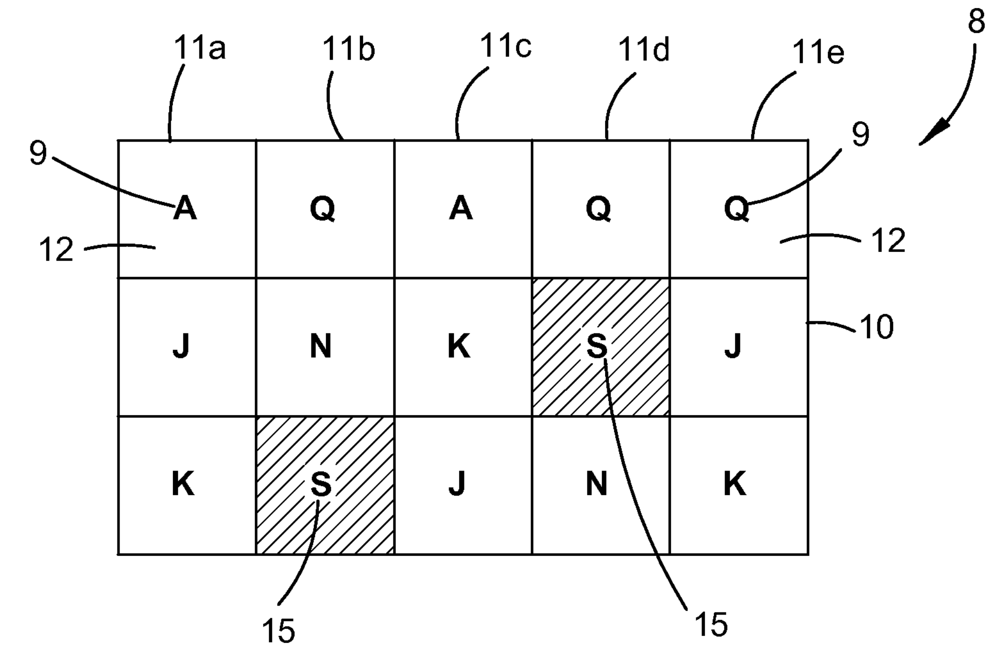
FIG. 17 is a schematic drawing illustrating a game displayed on an array of the electronic gaming machine according to another embodiment of the invention.
Figure 18:
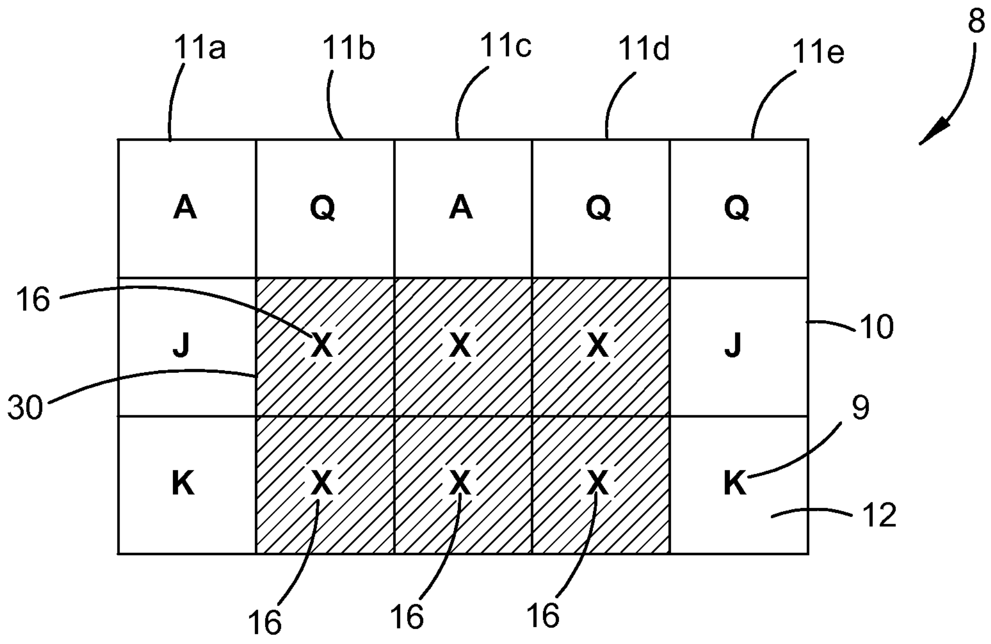
FIG. 18 is a schematic drawing illustrating a change to the game of FIG. 17.

Yet another embodiment is illustrated in FIGS. 17 and 18, where corresponding features have been given the same reference numerals. In this embodiment, two special S symbols 15 appear in reels 11b and 11c and this causes the electronic game controller 4 to select a group of cells 12 that defines a shape or pattern that is partly defined by or at least has the cells containing the S symbols, as best shown in FIG. 18. In this case, a rectangular shape 30 is selected due to the relative positions of the S symbols 15 in FIG. 17 in which each of the game symbols 9 in the selected cells 12 are changed into X symbols 16. It will be appreciated that other shapes or patterns will result depending on the relative positions of the special S symbols 15. For example, any one of the shapes and/or patterns described in FIGS. 10 to 16 above can be readily applied to this embodiment. In all other respects, this embodiment works in the same way as the embodiment of FIGS. 3 and 4 above.

Figure 19:
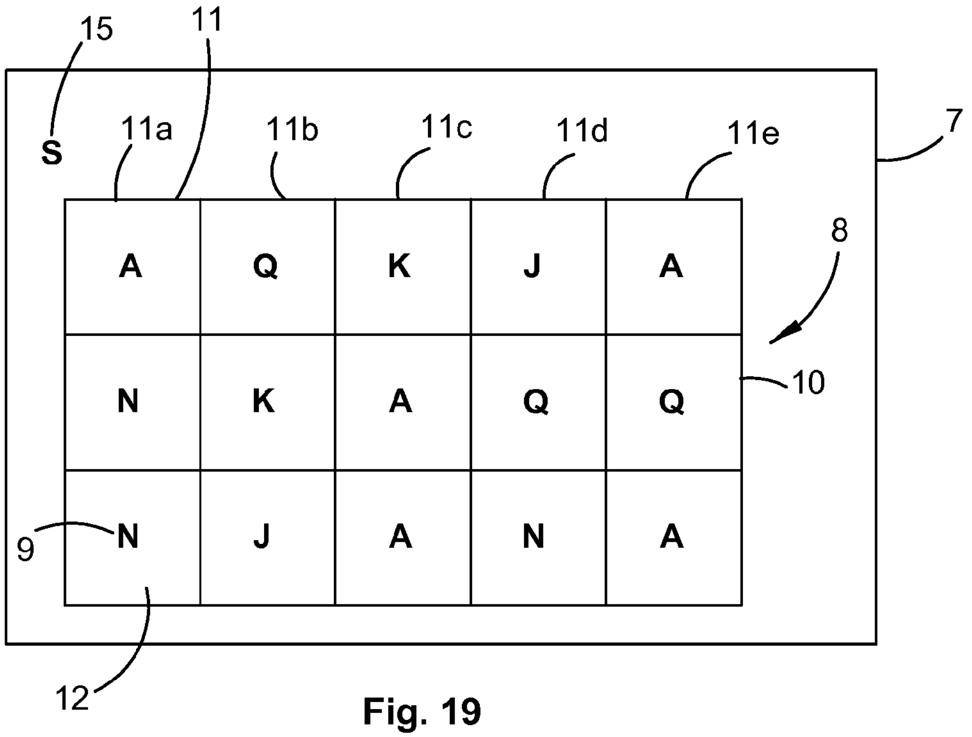
FIG. 19 is a schematic drawing illustrating a game displayed on an array of the electronic gaming machine according to a further embodiment of the invention.

A further embodiment of the invention is illustrated in FIG. 19, where corresponding features have been given the same reference numerals. This embodiment is unlike the other previously described embodiments as the special S symbol 15 does not appear on the array 10 of the game 8, but instead appears elsewhere on the display 7. In this case, the appearance of the special S symbol 15 triggers the electronic game controller 4 to randomly select cells 12 from the array 10 from at least two of the reels 11a, 11b, 11c, 11d, 11e to be changed into the special X symbol 16 (not shown). Alternatively, all of the cells 12 are selected to be changed into the special X symbol 16. In all other respects, this embodiment works in the same way as the embodiment of FIGS. 3 and 4 above.

Figure 20:
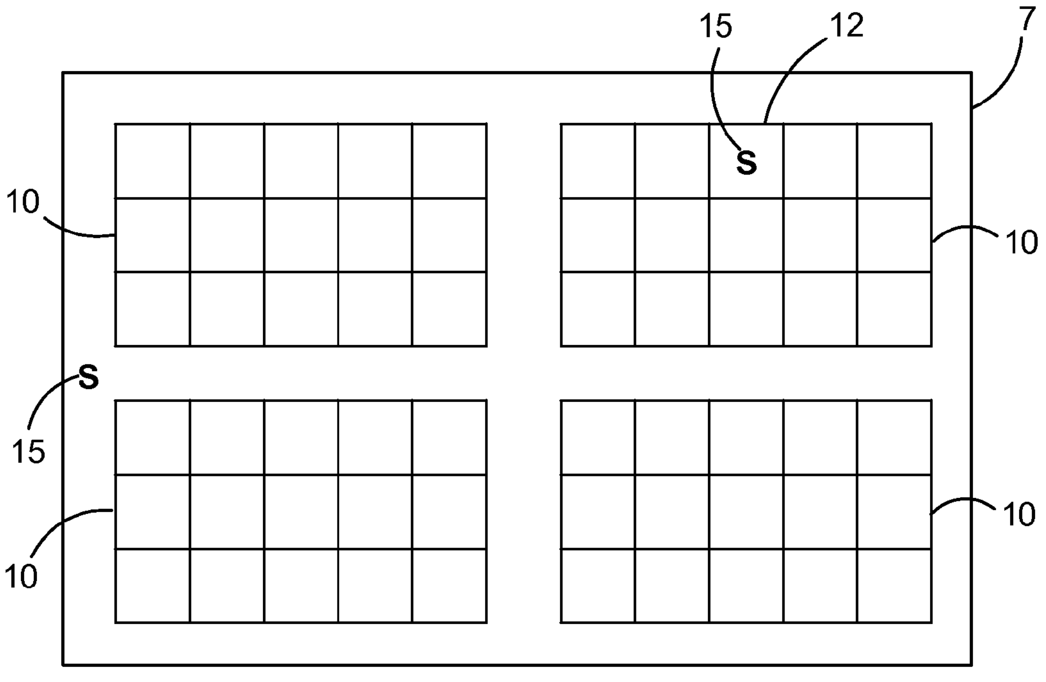
FIG. 20 is a schematic drawing illustrating a game displayed on an array of the electronic gaming machine according to yet another embodiment of the invention.

Another embodiment of the invention is illustrated in FIG. 20, where corresponding features have been given the same reference numerals. In this embodiment, there are multiple arrays 10 that either form part of the same game 8 or are separate games played independently. In either case, the appearance of the special S symbol 15 in one of the cells 12 or on the display 7 causes the electronic game controller 4 to randomly select cells 12 from each of the arrays 10 to be changed into the special X symbol 16 (not shown). The selected cells 12 may be from at least two reels of each array 10, from one or more of the reels in each array or confined to all but one or more of the arrays. In one preferred application, all of the cells 12 from each array 10 are selected so that all the symbols are changed into the special X symbol. In all other respects, this embodiment works in the same way as the embodiment of FIGS. 3 and 4 above.

While the preferred embodiments have described as including the special S symbol 15 as one of the game symbols that are changed into the special X symbol 16, it will be appreciated that in other embodiments the S symbol 15 does not form part of the selected group which are changed into the X symbol 16. Similarly, while the preferred embodiments in FIGS. 3 to 18 have been described as the selecting some of the cells 12 in the array 10 in which their associated symbols 9 are changed into the special X symbol, it will be appreciated that the selection can be modified so that all the cells 12 in the array are selected to form the group.

In one preferred form, there is more than one type of special S symbol 15, so that where two different types of special S symbols appear on the array two groups of cells 12 are selected. For example, the special S symbol 15 in FIG. 5 could be displayed as a "right" S symbol (such as adding to the S symbol the word "right" or an image representing the right like an arrow, pointer or the like directed to the right) to indicate that it causes the selection of the cells 12 to the right of the reel 11b the "right" S symbol appears in. Likewise, the special S symbol 15 in FIG. 7 could be displayed as a "left" S symbol (such as adding to the S symbol the word "left" or an image representing the left like an arrow, pointer or the like directed to the left) to indicate that it causes the selection of the cells 12 to the left of the reel 11d the "left" S symbol appears in. The appearance of the "left" and "right" S symbols at the same time results in selection of two groups of cells 12; one group to the left of the "left" S symbol and another group to the right of the "right" S symbol, which may result in all the cells 12 in the array being selected for change.

Similar to the special X symbol 16, in a further embodiment the special S symbol 15 may also have another function, such as being a substitute or wild symbol, scatter symbol, trigger symbol, jackpot symbol or the like.

In another preferred form, the individual cells 12 each represent a single "reel" so that the 5×3 array 10 in FIG. 3 has 15 separate reels instead of 5 reels. In this case, the invention would function in the same way, with the electronic game controller 4 selecting reels instead of cells 12 for the group in which the displayed game symbol 9 is changed into the special X symbol 16 in response to the initial appearance of the special S symbol 15 on the array 10.

In a further preferred form, the electronic game controller 4 determines winning combinations of the game symbols 9 at the conclusion of the spin of the reels 11 before determining whether the special S symbol 15 has appeared on the array and thus changing the selected group of game symbols into the special X symbol 16. In this embodiment, the player is given a second chance to obtain winning combinations of game symbols for a single spin of the reels 11. This embodiment adds to the player's excitement and thus retains his or her interest in playing the game 8 on the electronic gaming machine 1.

In yet another preferred form, the electronic game controller 4 does not wait for the all the reels to stop spinning before making a determination as to the appearance of a special S symbol 15. Instead, the electronic game controller 4 initiates selection of the group once the special S symbol 15 appears on the array 10 before the reels 11 stop spinning. This preferred form can heighten the player's anticipation while waiting for the reels 11 to stop spinning.

While the embodiments in FIGS. 3 to 16 have been described in relation to the appearance of a single special S symbol 15, it will be appreciated that more than one special S symbol can appear on the array 10. In this case, the selection of the group of symbols to be changed will be made for each special S symbol 15 and the determination of winning combinations of symbols will be based on both groups. Where there is an overlap in the selected cells 12, the groups will simply merge together. Likewise, although the embodiment in FIGS. 17 and 18 has been described in relation to two special S symbols 15, it will be appreciated that more than two special S symbols can appear on the array 10. In this case, the group is selected such that the shape or pattern includes the special symbols 15, and so may be rectangular, square or other polygon shape, or even be of irregular shape.

It will also be appreciated that the invention may be applied to either a main or "base" game or a feature game offered on the electronic gaming machine. Alternatively, the invention can be applied to both the base game and a feature game. In this case, the electronic game controller 4 controls the display so that during play of the base game on the array and in response to a trigger event, the electronic game controller 4 causes a feature game (not shown) to be displayed on the array. In one embodiment, the use of special S and X symbols 15 and 16 can be an additional feature of the base game that is accessible upon the player can making an additional side bet or ante-bet during play of the game 8

The feature game may employ the same array as the base game, as well as the same game symbols 9 that are used in the base game. However, it will be appreciated that the array for the feature game may vary from the base game. For example, the feature game could adopt a different format of cells and/or use an entirely different set of game symbols, or a mixture of game symbols from the base game and different game symbols.

Where the feature game adopts a reel-type format as illustrated in FIGS. 3 to 18, it typically comprises a predetermined number of free plays or spins of the reels 11. That is, the reels 11 in the feature game are spun without requiring the player to make a bet, unlike the base game. The number of free spins remaining in the feature game is typically indicated on the screen 7 by a suitable counter (not shown). In the feature game, predetermined winning combinations of randomly selected game symbols 9 result in the award of prizes to the player, usually of an enhanced value compared to the prizes awarded in the base game.

The video display screen 7 may also include a top screen, either as a separate display or integrated into the display screen 7, which provides jackpot information in the form of a major jackpot information box and a minor jackpot information box. The top screen ensures that the jackpot information is available to the player at all times during play of the electronic gaming machine 1.

In other preferred forms, the game 8 has other features like jackpot prizes. The jackpot prize can be shared with any other games offered on the electronic gaming machine (as in multi-game gaming machined) or games offered on separate electronic gaming machines. Information relating to the jackpot prize(s) can be provided on the screen 7 or via a top screen that is devoted to displaying jackpot information. In one preferred form, the jackpot prize comprises a mystery jackpot. That is, none of the symbols in the game trigger the jackpot; hence the triggering event is a "mystery". By way of comparison, a standard jackpot is typically symbol driven in that a particular combination of symbols must occur in the game to trigger the standard jackpot.

Also, in a further preferred form, the player can selectively stop spinning of the reels 11 to increase player interaction. Furthermore, the player can start spinning of the reels 11 to further enhance player interaction.

In the preferred embodiments, the video display screen 7 is a touch screen for use in addition to the player-actuatable buttons 6. This enables the player to select various features, such as responding to any messages or requests issued on the electronic gaming machine 1 by the electronic game controller 4. In this case, the player may control when the reels 11 start spinning and stop spinning in any of the games 8 by simply touching the relevant reel 11.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices) and other electronic devices capable of displaying a game. In the case of mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the electronic gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer program configured to perform the invention. In this way the invention can be implemented in various ways on an electronic gaming machine. In a further aspect, the invention includes a computer system configured comprising a central processing unit configured for communication with an electronic gaming machine to perform the invention. In a yet another aspect, the invention includes a non-transitive carrier medium carrying computer executable code that, when executed on a central processing unit configured for communication with an electronic gaming machine, causes said central processing unit to perform the invention. In this case, the non-transitive carrier medium includes an external hard drive, a memory device, including a memory card, smart card, a radio frequency identification (RFID) device, USB key, magnetic card or other electronic storage device.

It will further be appreciated that any of the features in the preferred embodiments of the invention can be combined together and are not necessarily applied in isolation from each other. For example, the use of the special symbols 15 and 16 can be a side or ante-bet feature of a base game can be combined with the provision of a separate feature game.

By providing special symbols that change into other special symbols that result in the increase chance of obtaining winning combinations of game symbols, the invention increases the player's excitement and heightens his or her anticipation of a higher prize. This retains player interest and encourages the player to continue playing the various games on the same electronic gaming machine. All these advantages of the invention result in the player being more likely to retain interest in continuing to play the same electronic gaming machine. Furthermore, since the electronic game controller controls operation of the electronic gaming machine, the invention can be readily implemented to existing gaming machines and other gaming systems. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An electronic wagering slot machine comprising:

a display for displaying a game, wherein said game comprises game symbols arranged into an array of game positions arranged in rows and columns and where predetermined winning combinations of randomly selected game symbols in said game award prizes to a player, vending slots for receiving monetary bets, and an electronic game controller adapted to determine if a bet has been received using the vending slots to initiate play of said game and to control the display of game symbols on the display if the bet has been received, wherein the appearance of a first special symbol in a predetermined game position of a first column on said display causes said electronic game controller to select a group of game positions, said group comprising all game positions in the columns to one side of said first column, and wherein each game symbol occupying a game position in said group is changed into a second special symbol either during a play of said game or at the completion of said play, said change into said second special symbol being visible to said player.

2. The electronic wagering slot machine of claim 1, wherein said group comprises at least one game position in said first column.

3. The electronic wagering slot machine of claim 2, wherein said group comprises the game position occupied by said first special symbol.

4. The electronic wagering slot machine of claim 1, wherein said one side is to the left of said first column.

5. The electronic wagering slot machine of claim 1, wherein said one side is to the right said first column.

6. The electronic wagering slot machine of claim 1, wherein said first symbol comprises a substitute symbol.

7. The electronic wagering slot machine of claim 1, wherein said second symbol comprises at least one of said game symbols, a substitute symbol, a symbol that reveals another game symbol and a new game symbol.

8. The electronic wagering slot machine of claim 1, wherein said second symbol is the same as, or has the same effect on said game, as said first special symbol.

9. The electronic wagering slot machine of claim 1, wherein said second symbol comprises two or more different second symbols such that said game symbols from said group change into at least two of said different second symbols.

10. The electronic wagering slot machine of claim 9, wherein one of said at least two different second symbols acts as both a second symbol and as the game symbol it changed from.

11. The electronic wagering slot machine of claim 1, wherein as part of said game, said columns visually move to simulate rotation thereof and said play comprises from when said columns begin to visually move to when said columns stop.

12. A gaming method for playing an electronic gaming machine comprising a display, vending slots for receiving monetary bets, and an electronic game controller, the method comprising the steps of:

determining if a bet has been received using the vending slots to initiate play of a game;

controllably displaying game symbols on said display for playing said game if the bet has been received, wherein said game symbols are arranged into an array of game positions, said game positions being arranged in rows and columns, and where predetermined winning combinations of randomly selected game symbols award prizes to a player;

in response to the appearance of a first special symbol in a predetermined game position of a first column on said display, selecting a group of game positions, said group comprising all game positions in the columns to one side of said first column, and changing each game symbol occupying a game position in said group into a second special symbol either during a play of said game or at the completion of said play, said change into said second special symbol being visible to said player.

13. The gaming method of claim 12, wherein said group selecting step comprises selecting at least one game position in said first column.

14. The gaming method of claim 13, wherein said group selecting step comprises selecting the game position occupied by said first special symbol.

15. The gaming method of claim 12, wherein said group selecting step comprises selecting all of the game positions in the columns to the left of said first column.

16. The gaming method of claim 12, wherein said group selecting step comprises selecting all of the game positions in the columns to the right said first column.

17. The gaming method of claim 12, further comprising providing said first symbol as a substitute symbol.

18. The gaming method of claim 12, wherein said changing step comprises changing said second symbol to at least one of said game symbols, a substitute symbol, a symbol that reveals another game symbol and a new game symbol.

19. The gaming method of claim 12, wherein said changing step comprises changing said second symbol to said first symbol or a symbol that has the same effect on said game as said first special symbol.

20. The gaming method of claim 12, wherein said second symbol comprises two or more different second symbols and said changing step comprises changing said game symbols from said group into at least two of said different second symbols.

21. The gaming method of claim 20, wherein one of said at least two different second symbols acts as both a second symbol and as the game symbol it changed from.

22. The gaming method of claim 12, further comprising the step of visually moving said columns as part of said game to simulate rotation of said columns and wherein said play comprises from when said columns begin to visually move to when said columns stop visually moving.

23. A computer system comprising a central processing unit configured for communication with an electronic gaming machine, wherein said computer system is configured to perform the method of claim 12.

24. A non-transitory carrier medium carrying computer executable code that, when executed on a central processing unit configured for communication with an electronic gaming machine, causes said central processing unit to perform the method of claim 12.

* * * * *